United States Patent [19]

Pieters

[11] 4,414,523

[45] Nov. 8, 1983

[54] ENCAPSULATED MAGNET FOR MAGNETIC DRIVE

[75] Inventor: Ferdinandus A. Pieters, Walnut Creek, Calif.

[73] Assignee: Micropump Corporation, Concord, Calif.

[21] Appl. No.: 299,865

[22] Filed: Sep. 4, 1981

[51] Int. Cl.³ .............................................. H01F 7/02
[52] U.S. Cl. .................................. 335/302; 335/306; 417/420
[58] Field of Search ................ 417/410, 420; 335/302, 335/303, 306

[56] References Cited

U.S. PATENT DOCUMENTS

| | | | |
|---|---|---|---|
| 3,575,536 | 4/1971 | Jacobs et al. | 417/420 |
| 3,938,914 | 2/1976 | Zimmermann | 417/420 |
| 4,080,112 | 3/1978 | Zimmermann | 417/420 |
| 4,111,614 | 9/1978 | Martin et al. | 417/420 |
| 4,127,365 | 11/1978 | Martin et al. | 417/410 X |

*Primary Examiner*—George Harris
*Attorney, Agent, or Firm*—Julian Caplan

[57] ABSTRACT

One of the annular magnets used in a magnetic drive for pumps and other devices is enclosed on the outside in a thin metal jacket. The jacket and the interior of the magnet and preferably one end thereof are filled with a plastic material which is apertured to receive the shaft on which the magnet is to be mounted. Means is provided in the plastic material for balance weights. The jacket and plastic are impervious to fluids being pumped so that the fluids are not contaminated and the magnet is not attacked by the fluids. A preferred method of making the combination is disclosed.

4 Claims, 5 Drawing Figures

ENCAPSULATED MAGNET FOR MAGNETIC DRIVE

This invention relates to a new and improved encapsulated magnet for magnetic drive and method of making same. A typical use for the present invention is in a pump having a magnetic drive, such as that shown in U.S. Pat. No. 4,165,206. In such installation, an outer annular magnet is turned by a motor. Within the outer magnet is an annular inner magnet connected to the pump shaft and isolated from the outer magnet by a thin metallic or plastic cup. The present invention relates to the encapsulation of one of the magnets and in the preferred embodiment this is the inner magnet.

In such a magnetically driven pump, the inner magnet (i.e., within the cup) is exposed to the fluid being pumped. The purpose of the present invention is to isolate the magnet from contact with the fluid.

In medical and other uses, it is important that the fluid being pumped not be contaminated. The materials of which ceramic annular magnets of the type used with the present invention are constructed may tend to contaminate some of the fluid with which they come in contact. By encapsulating the magnet with materials which do not contaminate such fluids, the scope of application of magnetically driven pumps is extended.

Conversely, fluids being pumped tend to attack ceramic magnets. Thus, concentrated acids eventually destroy such magnets. By encapsulating the magnet with a material that is not attacked by the fluid, this problem is likewise eliminated.

Still another problem with magnetic driven pumps is the attachment of the magnet to the pump shaft. Ceramic magnets generally are produced in such manner that the attachment of the magnet to the shaft requires structures difficult to produce, the use of such structures being eliminated in accordance with the present invention.

Another feature of the present invention is the facility with which it may be fabricated. The magnet is encased within a metal jacket and the magnet is further bonded to a plastic material which partially fills the core of the magnet in a manner such that the shaft is conveniently attached.

A still further feature of the invention is the formation in the plastic filler in the middle of the inner magnet of symmetric holes or recesses for installation of balancing weights to balance the magnet and its shaft kinetically and statically.

Still another feature of the invention is the fact that the jacket is quite thin and hence occupies very little of the available air gap between the magnet rings.

Other objects of the present invention will become apparent upon reading the following specification and referring to the accompanying drawings in which similar characters of reference represent corresponding parts in each of the several views.

Figure 1:
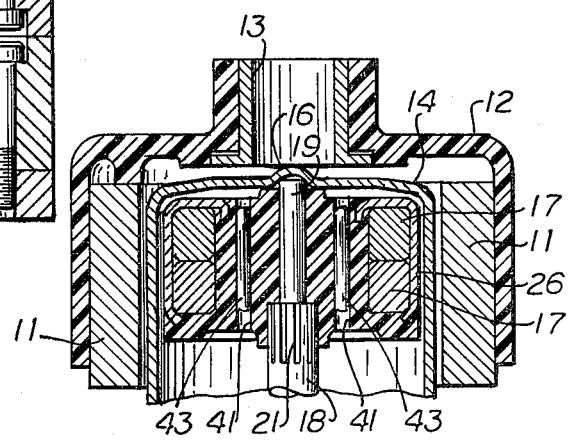
FIG. 1 is a fragmentary sectional view showing a magnetic drive for a pump with parts omitted to simplify explanation.

Shown partially in FIG. 1 and explained in greater detail in U.S. Pat. No. 4,165,206, as well as other patents of the assignee of this invention, is a magnetic drive for a pump. It will be understood that other magnetic drives may be used with the present invention and further that the drives may be used in installations other than pumps. As shown in FIG. 1, a ring or annular ceramic drive magnet 11 is secured within magnet retaining flange 12 which is attached to motor shaft hub 13 which is driven by the shaft of a motor (not shown). Fitting inside drive magnet 11 is a non-magnetic cup 14 of plastic or metal which is secured to the pump structure and comprises a barrier between the flange 12 and magnet 11 and the inner or driven magnets 17. It should be noted that there is a dimple 16 at the center of the cup which engages the outer end of stationery post 19 which is rotatably received in a bore (not shown) in the outer end of pump shaft 18. The outer end of shaft 18 is formed with an external spline 21 to drive the inner magnet as hereinafter explained.

Figure 2:
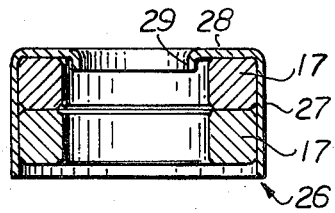
FIG. 2 is a midsectional view through the magnet and its mounting at the beginning of the fabrication thereof.

Magnet 17, is shown in the accompanying drawings as comprising two parts in side by side relationship, but a single magnet may be used. As shown in FIG. 2, the magnets 17,17 are inserted within the encapsulating jacket 26. The cylindrical portion 27 of the jacket has an inside diameter substantially equal to the outside diameters of the magnet 17. In-turned flange 28 bears against the side face of the inner magnet 17. An axially in-turned portion 29 is located slightly within the inside diameter of the magnet 17.

Figure 3:
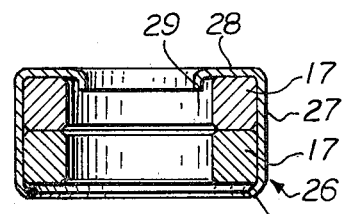
FIG. 3 is a view similar to FIG. 2 at a later stage in the fabrication.

The first step in the fabrication of the encapsulation of the magnet is shown in FIG. 3, where the cylindrical portion 27 is formed with a slight inward bend 31, which locks the magnet 17 in place. Since the jacket 26 is formed of a fluid-impervious material such as Austenitic stainless steel of a thickness of 0.005 to 0.015 inches, the outside of the magnets are protected.

Figure 4:
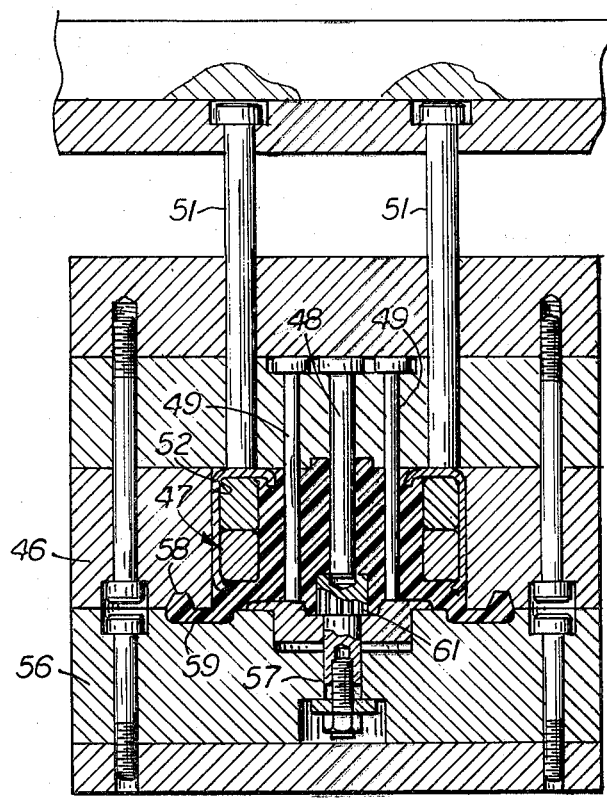
FIG. 4 is a sectional view showing the structure of FIG. 3 installed in a plastic mold and illustrates the molding step.
Figure 5:
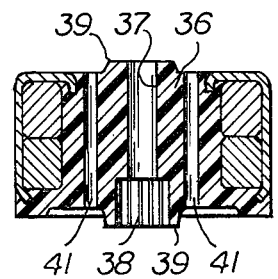
FIG. 5 is a sectional view showing the magnet complete and ready for installation in the pump environment of FIG. 1.

Turning now to FIG. 4, a typical plastic mold is illustrated, it being understood that this is merely one of many different molding techniques which may be employed. Mold half 46 receives the mold insert 47 which is substantially identical the structure shown in FIG. 3. The inside diameter of the cavity 52 in mold half 46 is very close to the outside diameter of the jacket 26. Mold half 46 is provided with a central pin 48 for the axial bore of the completed part and also with a plurality of pins 49 to form the holes 41. Ejector pins 51 are used after molding is completed to eject the part from the mold half 46.

Opposite mold half 46 is mold half 56. Part 56 has a central sprue through which the plastic is injected and a projection 61 to form spline 38. The runner 58 and gate 59 shown in FIG. 4 are broken off after the mold is completed.

Various materials may be used in the molding of the part, depending upon the end use of the pump. Typical plastic materials are: polypropylene, polyamide, acetal, polyphenylene sulphide, polysulphone, bakelite and the like. Alternatively, elastomers, such as buna n, neoprene, ethylene propylene, and various urethanes may be used. It will be noted that the plastic material 36 fills the inside of the magnets 47 except of the central bores 37 and the holes 41 which receive balancing weights 43.

The space between the in-turned portion 29 and the magnets 17 is filled and the inner edge of the bend 31 is further encapsulated. Hence no fluids come in contact with the magnets 17.

Shaft 18 is installed in the bore 37, the splines 21 and 38 matching and insuring that when the magnets 17 rotate, the shaft 18 rotates. The weights 43 are installed by well-known balancing techniques.

It is thus seen that the magnets 17 are entirely isolated from whatever fluids are being pumped or being confined within the cup 14. Hence, contamination of the fluids or, conversely, destruction of the magnets is eliminated. As will be seen, the method of fabrication greatly simplifies the mounting of the magnets 17 relative to the shaft 18.

What is claimed is:

1. An encapsulated rotatable magnet structure comprising an annular magnet having poles around its periphery and having an outer and an inner cylindrical surface and first and second substantially planar faces, the inner surface of said magnet being remote from the axis of rotation of said structure, a metallic jacket having a cylindrical portion positioned immediately outside said outer surface, said jacket having an in-turned flange on one edge of said cylindrical portion bearing against said first face and terminating in a short axially in-turned portion spaced inward of one edge of said inner cylindrical surface, said jacket having a slight inward bend on a second edge of said cylindrical portion crimped tightly against the corner where said second face and said outer cylindrical surface intersect and a central member having a hub formed with an axial bore formed to receive a shaft, said hub sealing against said inner surface and surrounding said in-turned portion, said central member having a flange sealing against said second face and surrounding said inward bend.

2. A magnet structure according to claim 1 in which said magnet is ceramic.

3. A magnet structure according to claim 1 in which said magnet comprises a pair of annular magnets side-by-side.

4. A magnet according to claim 2 in which said central member is formed with a plurality of holes in a concentric pattern to receive weights to balance said magnet.

* * * * *